Aug. 14, 1934.   C. C. GATES   1,969,792
CONE BELT
Filed Oct. 14, 1931
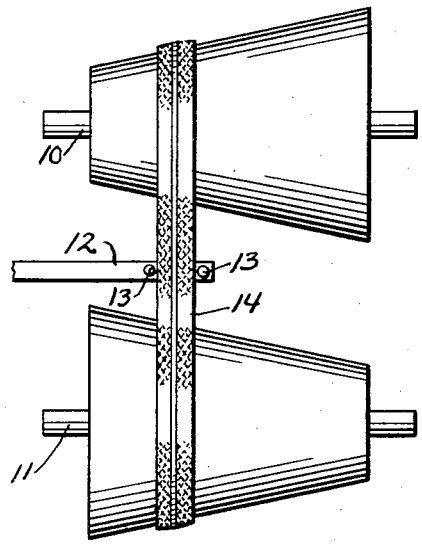
Fig.1.
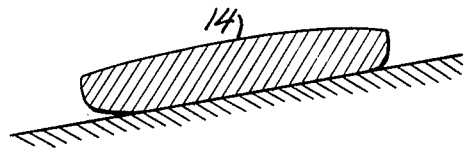
Fig.3.
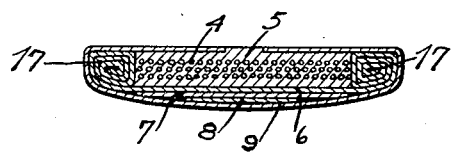
Fig.2.
Inventor
Charles C. GATES
By 
Attorney Patented Aug. 14, 1934

1,969,792

UNITED STATES PATENT OFFICE 1,969,792

CONE BELT

Charles C. Gates, Denver, Colo.

Application October 14, 1931, Serial No. 568,672

12 Claims. (Cl. 74—21)

This invention relates to improvements in belts and has reference more particularly to belts for use with cone drives.

In textile mills and other places where it is necessary to vary the speed of machinery, it is customary to employ cone drives which comprise two cone pulleys mounted on parallel shafts and connect by means of a belt. When flat belts are used in connection with cone drives of this type, the belts are subjected to distortions that produce excessive strains with the result that the life of the belt is very short.

It is the object of this invention to produce a belt that shall be so constructed that it can be employed in connection with cone drives without the production of excessive strain, and which shall also be provided with reenforced edges to absorb the wear of the shifting forks.

The belt that forms the subject of this invention, briefly described, comprises a central core formed from one or more layers of latex-treated cords embedded in a cushion of special gum rubber. This core is enclosed on one side and its two edges by means of a rubberized fabric strip of greater width than the core and whose edges are rolled and pressed along the sides of the core. On the driving side a plurality of strips of rubberized fabric of different widths are attached to the rubberized fabric covering and the whole is then enclosed in a fabric covering formed from bias cut rubberized fabric whose edges extend a short distance over the edges of the rubber core, but do not quite come together. A belt of the type just described has a convex driving surface and reenforced edges.

Having thus briefly described the invention, the same will now be described in detail and for this purpose, reference will be had to the accompanying drawing in which the preferred construction of the belt has been illustrated, and in which:

Fig. 1 is a plan view showing a cone drive with the improved belt in place thereon;

Fig. 2 is a transverse section of the belt; and

Fig. 3 is a section showing how the belt is deformed when in use.

The belt consists of one or more layers of latex-treated cords which have been designated by reference numeral 4 and these cords are cushioned in a layer of special gum rubber 5. The cords and their rubber covering form a substantially rectangular core as shown in Fig. 2. Secured to one side and the edges of the core is a strip 6 of rubberized fabric. This fabric may be bias cut so that the warp and woof run at an angle to the length of the belt. Strip 6 is cut somewhat wider than the core and the edges of the strip are rolled so as to form rolled beads 17 that are placed up against the edges of the core. After the fabric strip 6 has been put in place, two or more strips like those indicated by reference numerals 7 and 8 are applied to the covering. Strip 7 is slightly narrower than the core and strip 8 is narrower than strip 7 and both of them are applied in such a way that they extend equal distances on opposite sides of the center. After the strips have been put in place, bias cut rubberized fabric covering 9 is applied to the outside of the strips and the edges of this fabric are turned over on the outside of the rubber core, as shown in Fig. 2. The edges of the strip 9 do not come together, but leave a central strip of the rubber exposed. The open surface of the gummed strip permits free transverse flexing to conform to pulley angles.

In Fig. 1 two shafts have been shown and indicated by reference numerals 10 and 11. One of the shafts is a drive shaft and the other a driven shaft. A belt shifting fork 12 is associated with the cone drive and is provided with two fingers 13 between which the belt 14 is located. By means not shown on the drawing, the position of the fingers can be shifted in the direction of the axis of rotation of the cones. In shifting the belt the fingers come in contact with the edges and therefore unless the edges are well reenforced, they soon become frayed and worn. While the drive is functioning, the belt is also held in proper position by means of the belt shift fork and therefore during operation, the edges frequently contact with the fingers of the shifting fork. In order to reenforce the edges of the belt so that they will withstand the action of the fingers, the edges of the strip 6 have been rolled in the manner shown in Fig. 2 so as to provide a heavy fabric layer along each edge of the belt. When the belt is in place on the cones and properly tensioned, the driving surface which has been shown as convex in Fig. 2 comes in contact with the outer surfaces of the cones, and since these surfaces are inclined in opposite directions and are not parallel with the axis of rotation, it is evident that the belt will have to become distorted to some extent, and if an ordinary flat belt is used, those distortions produce excessive strains that shorten the life of the belt and result in poor operation. Due to the fact that the driving surface of this belt is convex, it is evident that unless it is tensioned so as to flatten it entirely, that only a portion of this convex surface will contact with the driving surfaces of the pulleys and therefore sufficient friction can be obtained without subjecting the belt to undue strains.

The open gum strip between the edges of the covering 9 permit freer transverse flexing so that the belt can conform to the pulley angles more readily than if the canvas entirely enclosed the belt.

Another advantage of the convex driving surface is that this allows easier shifting than when an ordinary flat belt of the type some times referred to as "bareback" fabric covered belts is used.

Although this belt has been specially designed for use with cone drives of the type employed for varying speed, it can also be used in connection with ordinary belt pulleys and is therefore not to be limited to the particular use for which it is best suited. The fabric covering 6, as well as the strips 7 and 8 and the outside covering 9, are preferably made from bias cut fabric so applied that the warp and woof extends to forty-five degrees angle to the length of the belt, but owing to the fact that this belt is comparatively thin and that the greater part of the fabric is on the inside of the cord core, the use of bias cut fabric is not absolutely necessary, but a more flexible belt is produced if bias cut fabric is employed than if the warp and woof extend parallel and at right angles to the belt, as it would if the strips were cut transversely of the cloth.

Having described the invention what is claimed as new is:

1. A cone pulley drive belt of greater width than thickness comprising a central core formed from a number of cords that extend in the direction of the length of the belt, a soft rubber cushion filler surrounding the cords, a rubberized fabric covering for the edges and one side of the belt, the center portion of the covering being formed of a greater number of layers than near the edges whereby a readily deformable convex driving surface is formed for engaging the surface of the cone pulleys, the whole being vulcanized together.

2. A cone pulley drive belt of greater width than thickness and formed with a central cord core embedded in a soft rubber cushion filler, one side and the two edges being provided with a covering of rubberized fabric, the driving surface being convex and readily deformable.

3. A cone pulley drive belt of greater width than thickness and formed from a core whose transverse section is substantially rectangular, the core having a center portion of substantially inextensible cord, a covering of rubberized fabric applied to one side of the core, the edges of the fabric being rolled and the rolled portion placed along the edges of the core, a plurality of strips of rubberized fabric of different width being placed on the outside surface of the fabric covering, whereby a convex driving surface is formed, and a covering of rubberized fabric extending over the strips and the rolled edges and onto the back of the belt, the whole being vulcanized together.

4. A cone pulley drive belt having greater width than thickness comprising, a core formed from latex-treated cords embedded in a cushion of gum rubber, and a rubberized fabric covering for one side and the edges, the covering extending over the other surface a short distance so as to leave a portion of the outer surface of the gum strip exposed, the fabric covered side being convex and readily deformable.

5. A cone pulley drive belt of greater width than thickness having a central core formed from substantially inextensible cords running in the direction of the length, said cords being embedded in a cushion of gum rubber, a rubberized fabric covering for one side, a roll of rubberized fabric extending along the edges of the core, a plurality of strips of different width, of rubberized fabric located on the outside of the fabric covering and a second covering of rubberized fabric extending over the side having the strips, about the edges of the belt and partly across the other side, leaving a strip of the rubber cushion exposed along the center, the whole being vulcanized.

6. A variable speed power transmission device comprising two shafts mounted for rotation about substantially parallel axes each shaft having secured thereto a pulley whose outer surface is conical, the two pulleys being oppositely arranged so that the small end of one will be opposite the large end of the other and a substantially inextensible power transmission belt of greater width than thickness encircling the pulleys and in contact with their inclined surfaces, said belt having a convex readily deformable driving surface.

7. A variable speed power transmission mechanism comprising two parallel shafts each of which has secured to it a cone pulley, the pulleys being oppositely arranged so that the smaller end of one is opposite the larger end of the other, a vulcanized, substantially inextensible power transmitting belt of greater width than thickness associated with the pulleys, said belt having its driving surface transversely convex, and readily deformable.

8. A variable speed drive comprising cone pulleys and a vulcanized substantially inextensible belt of greater width than thickness and provided with a readily deformable convex driving surface adapted to contact with the pulleys and connecting the same.

9. In a cone pulley drive, the combination with the pulleys of a vulcanized substantially inextensible belt of greater width than thickness and having a fabric covered transversely convex readily deformable driving surface connecting the pulleys, the side opposite the driving surface of the belt being flat.

10. A variable speed drive comprising cone pulleys endwise reversely arranged and a substantially inextensible driving belt connecting the said pulleys, said belt being of greater width than thickness and provided with a readily deformable transversely convex driving surface.

11. A variable speed drive comprising cone pulleys endwise reversely arranged, and a substantially inextensible belt of greater width than thickness and provided with a transversely convex driving surface connecting the said pulleys, the belt being formed from rubberized material whereby its pulley connecting surface is readily deformable.

12. A variable speed drive mechanism comprising cone pulleys endwise reversely arranged, and a substantially inextensible driving belt of greater width than thickness and connecting the pulleys and provided with a readily deformable transversely convex driving surface formed from bias cut rubberized fabric.

CHARLES C. GATES.